(No Model.)
J. LIDSTONE.
Steam Cooker.
No. 233,261. Patented Oct. 12, 1880.
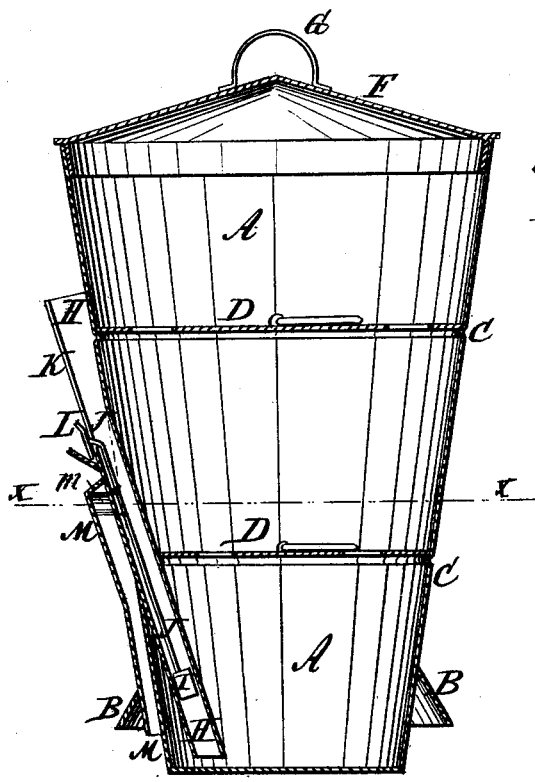
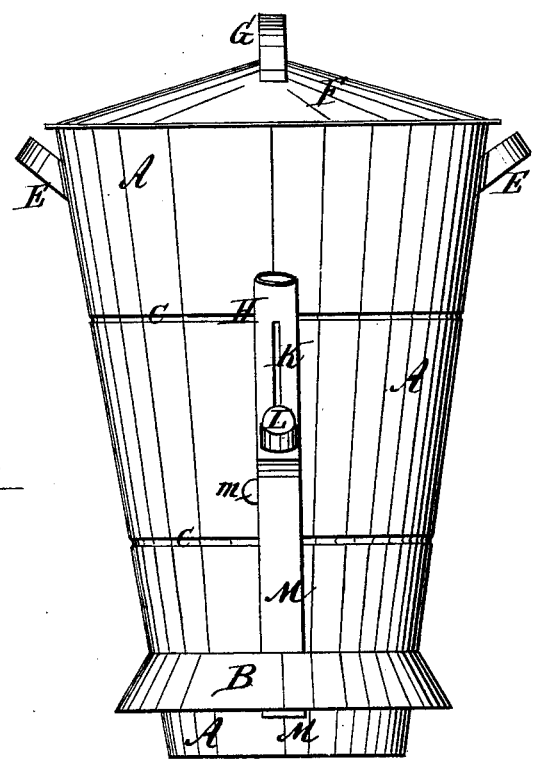
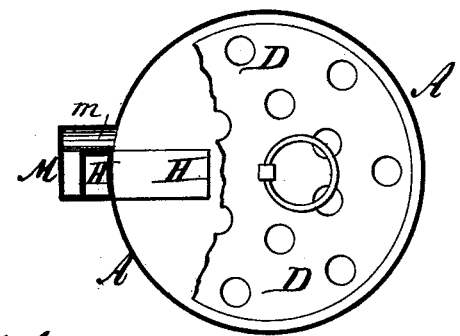
WITNESSES:
A. Schehl,
C. Sedgwick.
INVENTOR:
J. Lidstone
BY Munn & Co.
ATTORNEYS.

UNITED STATES PATENT OFFICE.

JAMES LIDSTONE, OF FARMINGTON, MAINE.

STEAM-COOKER.

SPECIFICATION forming part of Letters Patent No. 233,261, dated October 12, 1880.

Application filed April 30, 1880. (No model.)

*To all whom it may concern:*

Be it known that I, JAMES LIDSTONE, of Farmington, in the county of Franklin and State of Maine, have invented a new and useful Improvement in Steam-Cookers, of which the following is a specification.

Figure 1 is a sectional elevation of the improvement. Fig. 2 is a side elevation. Fig. 3 is a sectional plan view taken through the line *x x*, Fig. 1.

Similar letters of reference indicate corresponding parts.

The object of this invention is to furnish an improved steam-cooker for cooking meats, vegetables, &c. The novelty consists in the construction and arrangement of parts, as hereinafter described and claimed, whereby the steam and odors of the cooking food are conducted from the several compartments of the cooker into the fire-space below, and thereby prevented from escaping into the room; also, whereby the quantity or depth of water in the cooker is constantly indicated by a tube and a float working therein without allowing any steam or odor of cooking food to escape, save a quantity so small as to be seldom perceptible.

I do not claim, broadly, a tube and float for indicating depth of water in a steam-cooker; but in other cases the tube has been so constructed and arranged as to allow escape of odors from the whole interior of the cooker.

The invention consists in the combination, with the slotted tube leading into the lower part of the cooker and the wire attached to the float working in the said tube, of the indicating button, whereby the depth of water in the cooker can be known at a glance from any part of the room, and also in the combination, with the cooker, of the tube leading down along the side of the cooker to the space between the flange and the cooker, and connected at its upper end by a short tube with a hole in the side of the said cooker, whereby the steam and odors will be conducted into the fire, as will be hereinafter fully described.

A represents the body of the cooker, which tapers from its top to its bottom, as shown in Figs. 1 and 2. The lower end of the body A is made of such a size that it will enter the boiler-holes of any ordinary range or stove.

To the body A, at a little distance from its bottom, is attached a flaring flange, B, the lower edge of which rests upon the top of the stove or range and supports the cooker.

The body A is divided into three parts of nearly equal size by two inwardly-projecting beads, C, which serve as shoulders for perforated sheet-metal plates D to rest upon, so that they can be readily removed when desired.

To the sides of the cooker A, near its top, are attached handles E, for convenience in handling the said cooker. The cooker A is also provided with a cover, F, the flange of which fits into the mouth of the said cooker, and which is made steam-tight by pressing it down snugly. The cover F is also provided with a handle, G, in the ordinary manner.

H is an inclined tube, which passes in through a hole in the side of the lower part of the cooker A and extends nearly to the bottom of the said cooker. The tube H is open at both ends, and within it is placed a float, I, to which is attached a wire, J. The wire J passes up through the tube H, and its upper end is bent outward, passes through a slot, K, in the upper part of the tube H, and has a button, L, attached to it, so that the cook can see the button L from any part of the room, and thus know at a glance how much water there may be in the cooker. The upper part of the tube H is flared, so that water can be readily poured through the said tube into the cooker A when required without removing the cover or disturbing the food.

At the outer side of the tube H is placed a tube, M, which passes down along the outer side of the cooker A into the space between the flange B and the lower part of the said cooker A. The upper part of the tube M is connected, by a short tube, *m*, with a hole in the side of the cooker A between the two perforated plates D, so that the steam and the odors from the substances being cooked will pass through the said tube M into the fire.

I do not claim, broadly, an exterior tube and float attachment for a steam-cooker; but,

Having thus described my invention, I claim as new and desire to secure by Letters Patent—

1. The combination, with the steam-cooker A, having communicating compartments, of the tube H, one part of which extends diagonally through the side and down to the bottom of the cooker, and has no opening save at the lower end, the outer portion being slotted, as described, and the float I, having the bent stem J, provided with the button L, all as shown and described, whereby the float and button constantly indicate the depth of water, yet no steam or odor can escape from the tube save such as may be generated within it.

2. In a steam-cooker, the combination, with the cooker A, of the tube M, leading down along the side of the cooker A to the space between the flange B and cooker A, and connected at its upper end, by a short tube, m, with a hole in the side of the said cooker, substantially as herein shown and described, whereby the steam and odors will be conducted into the fire, as set forth.

JAMES LIDSTONE.

Witnesses:
 ISAIAH TIBBETTS,
 ANDREW T. TUCK.